United States Patent
Tanabe et al.

(10) Patent No.: US 8,072,478 B2
(45) Date of Patent: Dec. 6, 2011

(54) OPTICAL SCANNING DEVICE, IMAGE FORMING APPARATUS, AND WRITE METHOD

(75) Inventors: Jun Tanabe, Kanagawa (JP); Shigeaki Imai, Kanagawa (JP); Seizo Suzuki, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 496 days.

(21) Appl. No.: 12/207,047

(22) Filed: Sep. 9, 2008

(65) Prior Publication Data
US 2009/0074437 A1 Mar. 19, 2009

(30) Foreign Application Priority Data
Sep. 11, 2007 (JP) ................. 2007-235292

(51) Int. Cl.
*B41J 2/47* (2006.01)
*B41J 2/455* (2006.01)

(52) U.S. Cl. ..................... 347/253; 347/233
(58) Field of Classification Search .......... 347/253, 347/233
See application file for complete search history.

(56) References Cited

U.S. PATENT DOCUMENTS

| | | | |
|---|---|---|---|
| 6,233,081 B1 | 5/2001 | Suzuki et al. |
| 6,347,004 B1 | 2/2002 | Suzuki et al. |
| 6,384,949 B1 | 5/2002 | Suzuki |
| 6,388,792 B1 | 5/2002 | Atsuumi et al. |
| 6,400,391 B1 | 6/2002 | Suhara et al. |
| 6,417,509 B1 | 7/2002 | Atsuumi et al. |
| 6,448,998 B1 | 9/2002 | Suzuki et al. |
| 6,509,995 B1 | 1/2003 | Suzuki et al. |
| 6,596,985 B2 | 7/2003 | Sakai et al. |
| 6,657,761 B2 | 12/2003 | Suzuki et al. |
| 6,771,407 B2 | 8/2004 | Hayashi et al. |
| 6,781,729 B2 | 8/2004 | Suzuki et al. |
| 6,785,028 B1 | 8/2004 | Atsuumi et al. |
| 6,788,444 B2 | 9/2004 | Suzuki et al. |
| 6,791,729 B2 | 9/2004 | Atsuumi et al. |
| 6,813,051 B2 | 11/2004 | Suzuki et al. |
| 6,829,104 B2 | 12/2004 | Suzuki et al. |
| 6,833,940 B2 | 12/2004 | Suzuki et al. |
| 6,906,739 B2 | 6/2005 | Suzuki et al. |
| 6,999,208 B2 | 2/2006 | Suzuki et al. |
| 7,006,120 B2 | 2/2006 | Sakai et al. |
| 7,038,822 B2 | 5/2006 | Sakai et al. |
| 7,045,773 B2 | 5/2006 | Suzuki et al. |
| 7,050,082 B2 | 5/2006 | Suzuki et al. |
| 7,061,658 B2 | 6/2006 | Suzuki |
| 7,088,485 B2 | 8/2006 | Suzuki |
| 7,167,288 B2 | 1/2007 | Miyatake et al. |
| 7,215,354 B1 | 5/2007 | Sakai et al. |

(Continued)

FOREIGN PATENT DOCUMENTS
JP 2007-130793 5/2007

*Primary Examiner* — Stephen Meier
*Assistant Examiner* — Sarah Al Hashimi
(74) *Attorney, Agent, or Firm* — Dickstein Shapiro LLP

(57) ABSTRACT

An optical scanning device acquires a displacement amount of each of scanning light beams in the main scanning direction, and corrects, based on the displacement amount, writing energy density at a write position such that a variation in image density due to a variation of the displacement amount is reduced. The light beams are used for scanning a target surface to write image data on the target surface. The writing energy density is an amount of light per unit surface area of the target surface.

11 Claims, 13 Drawing Sheets

U.S. PATENT DOCUMENTS

| | | |
|---|---|---|
| 7,256,815 B2 | 8/2007 | Suzuki et al. |
| 7,277,212 B2 | 10/2007 | Miyatake et al. |
| 7,333,254 B2 | 2/2008 | Amada et al. |
| 7,403,316 B2 | 7/2008 | Amada |
| 2002/0114081 A1* | 8/2002 | Ogura ................ 359/629 |
| 2004/0036936 A1 | 2/2004 | Nakajima et al. |
| 2004/0240000 A1 | 12/2004 | Miyatake et al. |
| 2005/0024479 A1 | 2/2005 | Itabashi et al. |
| 2005/0190420 A1 | 9/2005 | Imai et al. |
| 2006/0158711 A1 | 7/2006 | Imai et al. |
| 2007/0058255 A1 | 3/2007 | Imai et al. |
| 2007/0132828 A1 | 6/2007 | Ishida et al. |
| 2007/0236557 A1 | 10/2007 | Imai et al. |
| 2008/0019255 A1 | 1/2008 | Imai et al. |
| 2008/0068678 A1 | 3/2008 | Suzuki et al. |
| 2008/0088893 A1* | 4/2008 | Ishida et al. ............ 358/509 |
| 2008/0123160 A1* | 5/2008 | Omori et al. ............ 358/475 |
| 2008/0170283 A1 | 7/2008 | Imai |
| 2008/0192323 A1 | 8/2008 | Nakamura et al. |
| 2008/0204841 A1 | 8/2008 | Suzuki et al. |
| 2008/0204852 A1 | 8/2008 | Amada et al. |
| 2008/0225106 A1 | 9/2008 | Omori et al. |

* cited by examiner

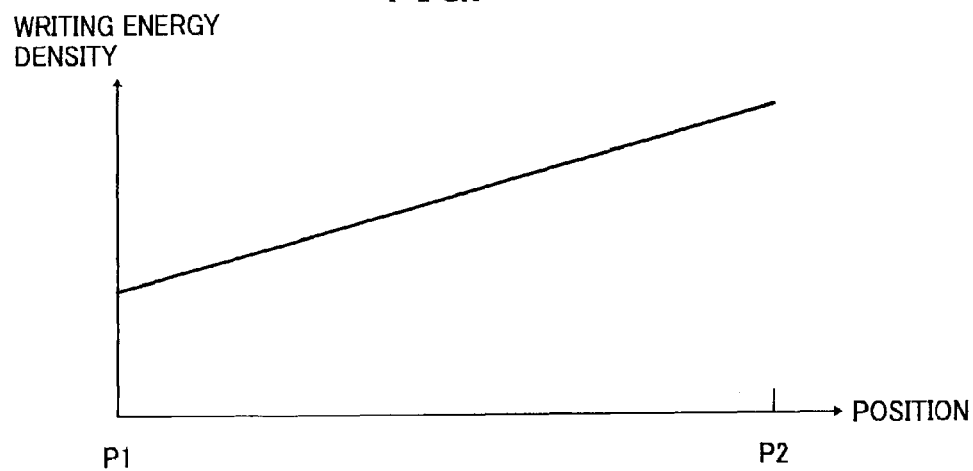
FIG. 10A
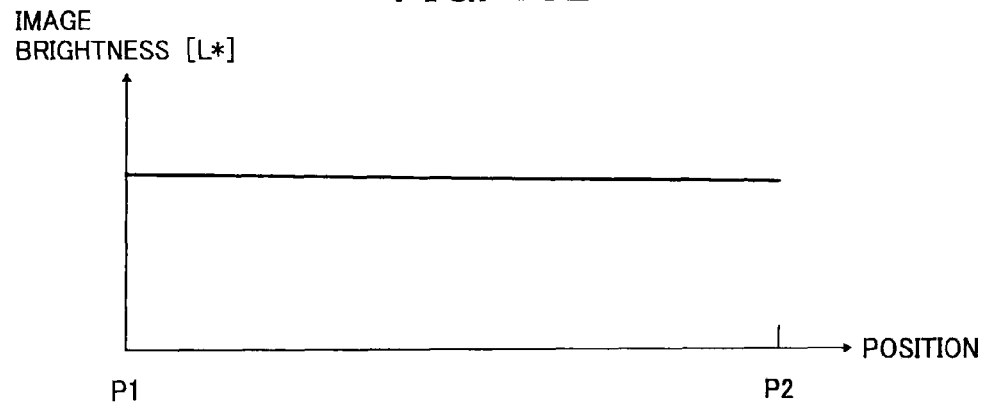
FIG. 10B
FIG. 10C
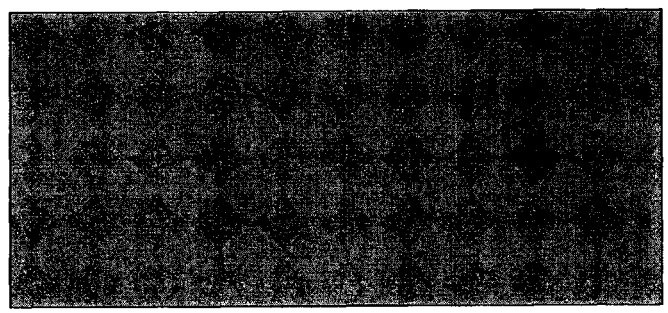

OPTICAL SCANNING DEVICE, IMAGE FORMING APPARATUS, AND WRITE METHOD

CROSS-REFERENCE TO RELATED APPLICATIONS

The present application claims priority to and incorporates by reference the entire contents of Japanese priority document 2007-235292 filed in Japan on Sep. 11, 2007.

BACKGROUND OF THE INVENTION

1. Field of the Invention

The present invention relates to a technology for correcting a light amount per unit area of a surface to be scanned in an optical scanning device.

2. Description of the Related Art

Recently, in image forming apparatuses such as laser printers and digital copying machines, enhancement of printing speed (speeding up) and writing density (high picture quality) are demanded. To accomplish the above requirements, a multi-beam light source that can radiate a plurality of light beams to scan a target surface is increasingly used. Various techniques about scanning optical systems that can support the multi-beam have also been suggested.

When forming an image by scanning a target surface with a plurality of the light beams, beam displacement may occur on one portion of a sheet in a main scanning direction due to various reasons such as wavelength variation among beams (changes at random), irregularity of a scanning lens, or surface precision of a polygon mirror. If a variation of a displacement amount exceeds a predetermined value (for example, 30 micrometers) and when an image is printed on a sheet with such a variation, a brightness difference (a density difference) is apparently seen between one portion and another portion of the sheet (for example, the brightness difference is equal to or larger than 5 levels).

An image forming apparatus that can handle the above problems is disclosed, for example, in Japanese Patent Application Laid-open No. 2007-130793. The image forming apparatus includes a pixel-clock generating device and can correct a scanning speed error. The pixel-clock generating device includes a high-frequency clock generating unit, an edge detecting unit, a comparing unit, a frequency calculating unit, and a dividing unit. The high-frequency clock generating unit generates a high frequency clock. The edge detecting unit detects edges of a first synchronizing signal and a second synchronizing signal after removing noise in the first and the second synchronizing signals. The comparing unit detects a time interval between the first and the second synchronizing signals, compares a detected value and a target value, and outputs an error between the two values. The frequency calculating unit calculates a setting value of a pixel clock frequency based on the error that is output by the comparing unit and outputs, based on the calculated setting value, frequency indicating signals that indicate the pixel clock frequency. The dividing unit generates the pixel clock by dividing the high frequency clock based on the frequency indicating signals that are output by the frequency calculating unit.

Generally, a semiconductor laser is used as a light source. Although previously an edge-emitting laser was mainly used, recently a surface emitting laser known as a vertical cavity surface emitting laser (VCSEL) has been increasingly used. Because the surface emitting laser can be arrayed much easier than the edge-emitting laser, as much as from 16 beams to 32 beams or more are available with the surface emitting laser while only from 4 beams to 8 beams are available with the end-face emitting laser. Therefore, the surface emitting laser is preferable as the light source for improving printing speed and writing density of the image forming apparatus.

In the image forming apparatus described above, beam displacement in the main scanning direction can be controlled by regulating a data width for each line. However, if the beams increase in number, required memory size increases in the image forming apparatus, resulting in degradation in circuit size, processing speed, power consumption, or the like.

SUMMARY OF THE INVENTION

It is an object of the present invention to at least partially solve the problems in the conventional technology.

According to an aspect of the present invention, there is provided an optical scanning device that scans a target surface with a plurality of light beams to write image data on the target surface and includes a light source that includes a plurality of light emitting units each emitting a light beam; an optical system that focuses the light beams on the target surface as optical spots and scans the target surface in a main scanning direction with the optical spots; and a correcting unit that corrects, based on a displacement amount of each of the light beams in the main scanning direction, writing energy density at a write position such that a variation in image density due to a variation of the displacement amount is reduced.

According to another aspect of the present invention, there is provided an image forming apparatus that includes at least one image carrying member; and at least one optical scanning device that scans the image carrying member with a plurality of light beams to write image data on the image carrying member. The optical scanning device includes a light source that includes a plurality of light emitting units each emitting a light beam; an optical system that focuses the light beams on the image carrying member as optical spots and scans the image carrying member in a main scanning direction with the light spots; and a correcting unit that corrects, based on a displacement amount of each of the light beams in the main scanning direction, writing energy density at a write position such that a variation in image density due to a variation of the displacement amount is reduced.

According to still another aspect of the present invention, there is provided a write method of writing image data on a target surface by scanning the target surface with a plurality of light beams, and including acquiring a displacement amount of each of the light beams in the main scanning direction; and correcting, based on the displacement amount, writing energy density at a write position such that a variation in image density due to a variation of the displacement amount is reduced.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 10A to 10C are schematic diagrams for explaining correction of writing energy density;

DETAILED DESCRIPTION OF THE PREFERRED EMBODIMENTS

Exemplary embodiments of the present invention are explained in detail below with reference to the accompanying drawings.

Figure 1:
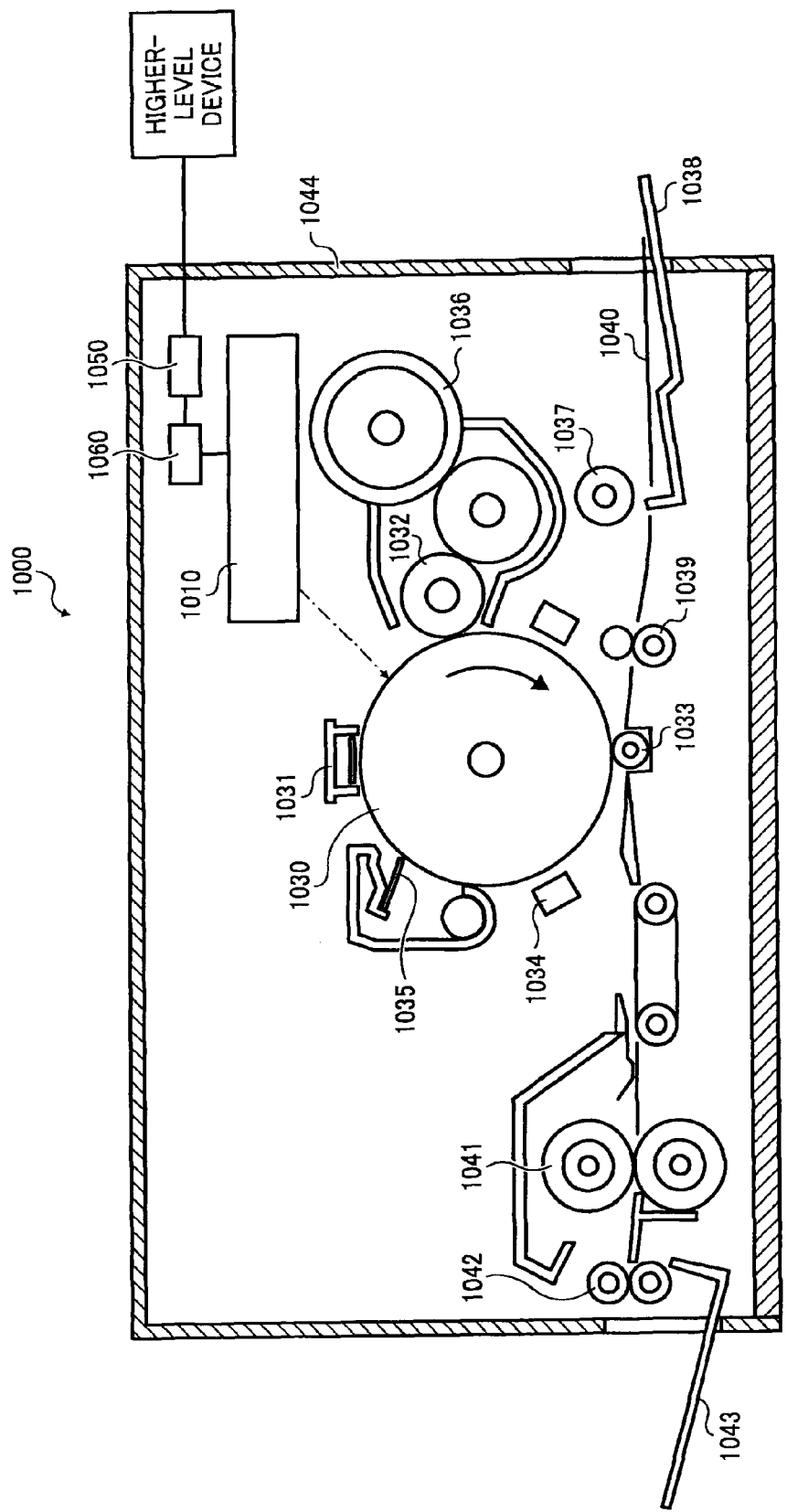
FIG. 1 is a schematic diagram of a laser printer according to an embodiment of the present invention.

FIG. 1 is a schematic diagram of a laser printer 1000 as an image forming apparatus according to an embodiment of the present invention.

The laser printer 1000 includes an optical scanning device 1010, a photosensitive drum 1030, an electrostatic charger 1031, a developing roller 1032, a transfer charger 1033, a neutralizing unit 1034, a cleaning blade 1035, a toner cartridge 1036, a sheet feeding roller 1037, a sheet feeding tray 1038, a pair of registration rollers 1039, a fixing roller 1041, discharge rollers 1042, a discharge tray 1043, a communication controller 1050, and a printer controller 1060 that integrally controls the above units. The units are placed at a predetermined position inside a printer body 1044.

The communication controller 1050 controls a two-way communication with external devices via a network etc.

The photosensitive drum 1030 is a cylindrical member and a photosensitive layer is formed on a surface of the photosensitive drum 1030. The surface of the photosensitive drum 1030 is a target surface to be scanned. The photosensitive drum 1030 rotates in a direction indicated by an arrow shown in FIG. 1.

The electrostatic charger 1031, the developing roller 1032, the transfer charger 1033, the neutralizing unit 1034, and the cleaning blade 1035 are sequentially disposed in that order along the surface of the photosensitive drum 1030 along a rotation direction of the photosensitive drum 1030.

The electrostatic charger 1031 uniformly charges the surface of the photosensitive drum 1030.

The optical scanning device 1010 irradiates light beams, which are modulated based on image data from a higher-level device (for example, a personal computer), on the surface of the photosensitive drum 1030 that is charged by the electrostatic charger 1031. Due to this, a latent image corresponding to the image data is formed on the surface of the photosensitive drum 1030. The latent image moves in a direction of the developing roller 1032 with a rotation of the photosensitive drum 1030. A structure of the optical scanning device 1010 will be described later.

The toner cartridge 1036 stores therein toner and the toners are supplied to the developing roller 1032.

The developing roller 1032 causes the toner supplied from the toner cartridge 1036 to adhere to the latent image formed on the surface of the photosensitive drum 1030, and converts the image data into a visual image. The latent image (hereinafter, "toner image") to which the toner is deposited moves towards the transfer charger 1033 with the rotation of the photosensitive drum 1030.

The sheet feeding tray 1038 stores therein recording sheets 1040. The sheet feeding roller 1037 is disposed in the vicinity of the sheet feeding tray 1038. The sheet feeding roller 1037 picks up the recording sheets 1040 one by one from the sheet feeding tray 1038 and conveys to the pair of the registration rollers 1039. The registration rollers 1039 temporarily hold the recording sheets 1040 picked up by the sheet feeding roller 1037, and transmit, along with the rotation of the photosensitive drum 1030, the recording sheets 1040 towards a gap between the photosensitive drum 1030 and the transfer charger 1033.

To electrically attract the toner on the surface of the photosensitive drum 1030 to the recording sheets 1040, a voltage of opposite polarity is applied to the transfer charger 1033. Due to the voltage, a toner image on the surface of the photosensitive drum 1030 is transferred to the recording sheets 1040. The recording sheets 1040 to which the toner images are transferred are delivered to the fixing roller 1041.

Heat and pressure are applied to the recording sheets 1040 at the fixing roller 1041 and thus the toner is fixed on the recording sheets 1040. The recording sheets 1040 on which the toner is fixed are transferred to the discharge tray 1043 via the discharge rollers 1042 and sequentially stacked in the discharge tray 1043.

The neutralizing unit 1034 neutralizes the electric charge of the surface of the photosensitive drum 1030.

The cleaning blade 1035 removes the toner (residual toner) remaining on the surface of the photosensitive drum 1030. Further, the removed residual toner is reutilized. The surface of the photosensitive drum 1030 on which the electric charge is neutralized again returns to a position of the electrostatic charger 1031.

The structure of the optical scanning device 1010 is explained below.

Figure 2:
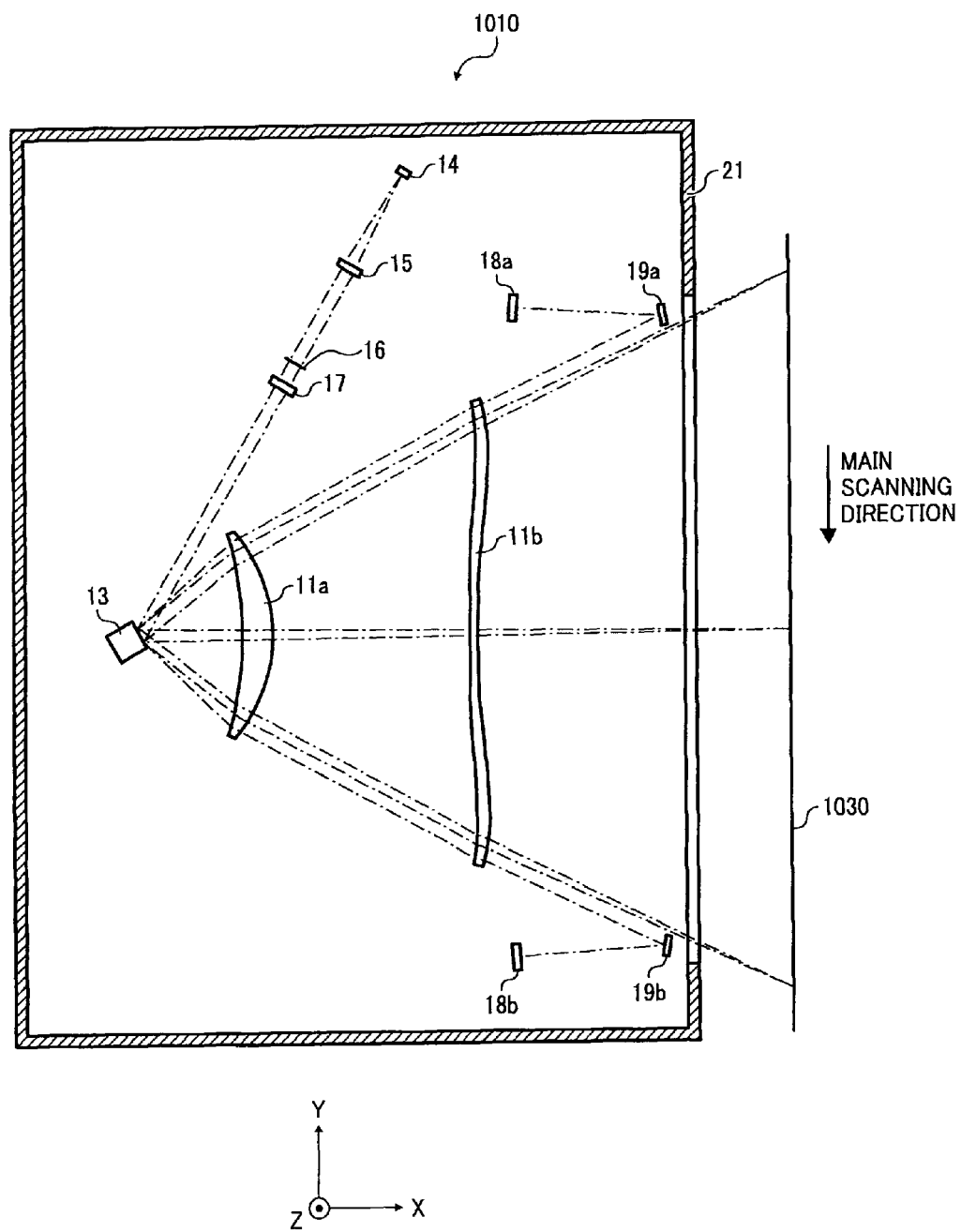
FIG. 2 is a schematic diagram of an optical scanning device shown in FIG. 1.
Figure 4:
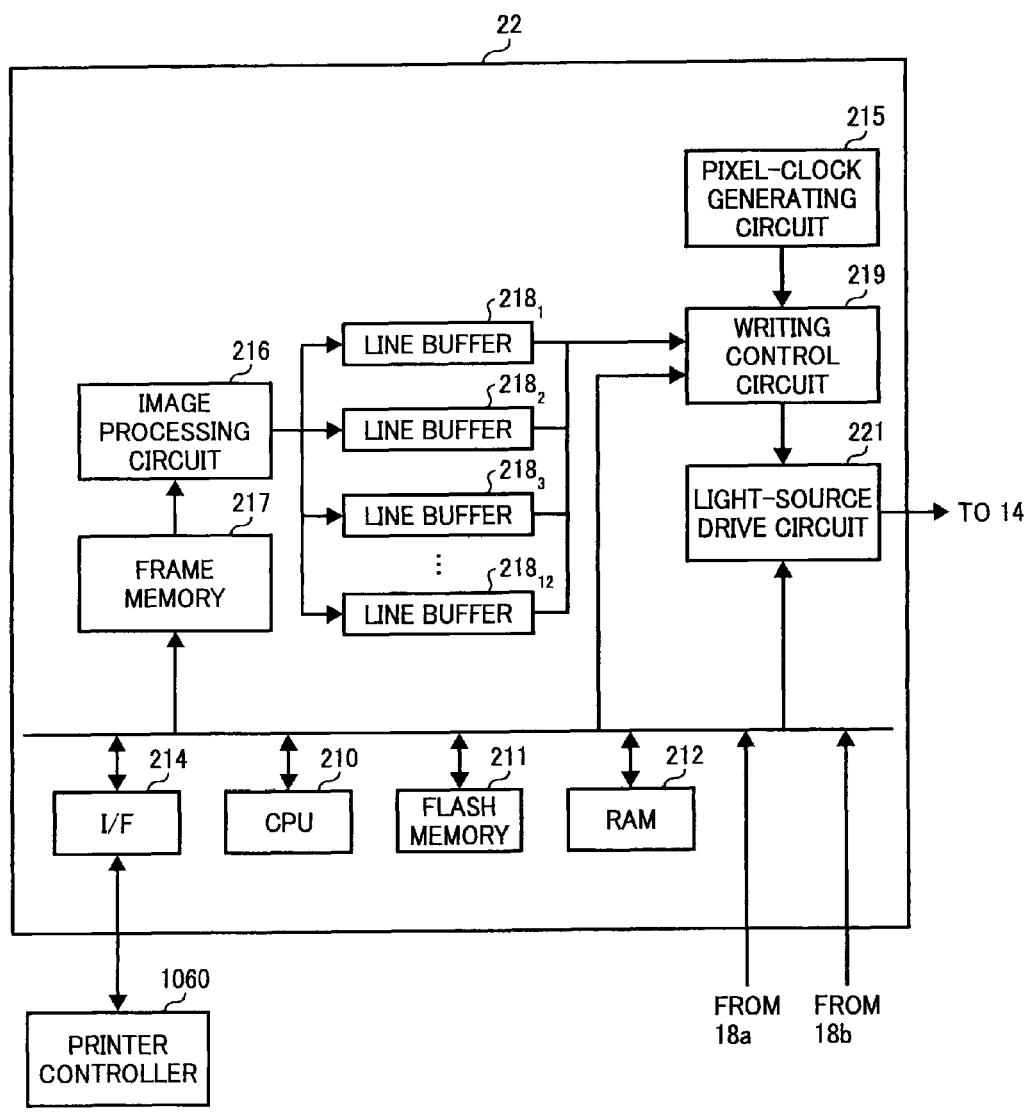
FIG. 4 is a block diagram of a scanning controller.

As shown in FIG. 2, the optical scanning device 1010 includes a light source 14, a coupling lens 15, an aperture plate 16, a cylindrical lens 17, a polygon mirror 13, a deflector-side scanning lens 11a, an image-surface-side scanning lens 11b, two light detecting sensors 18a and 18b, two light detecting mirrors 19a and 19b, and a scanning controller 22 (omitted in FIG. 2, shown in FIG. 4). These components of the optical scanning device 1010 are assembled at a predetermined position inside a housing 21.

In the present embodiment, a three-dimensional orthogonal coordinate system is used, and a direction along a longitudinal direction of the photosensitive drum 1030 is assumed as a Y-axis direction and a direction along an optical axis of both the deflector-side scanning lens 11a and the image-surface-side scanning lens 11b is assumed as an X-axis direction.

Figure 3:
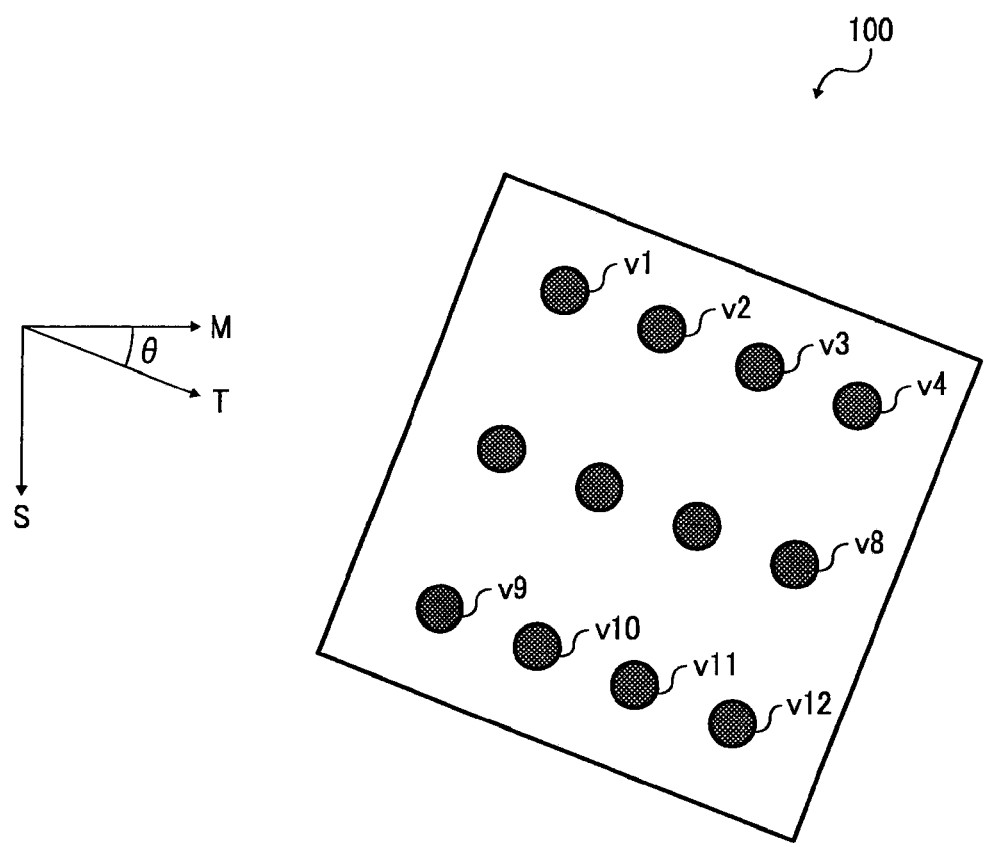
FIG. 3 is a schematic diagram of a two-dimensional VCSEL array in a light source shown in FIG. 2.

As shown in FIG. 3, the light source 14 includes a two-dimensional array 100 formed of 12 light-emitting units (v1 to v12) arranged in a matrix form on a base plate. Further, light beams emitted from the light emitting units v1 to v12 are indicated by CH1 to CH12, respectively.

A direction M shown in FIG. 3 corresponds to the main scanning direction and a direction S corresponds to a sub-scanning direction (in the example shown in FIG. 3, same as a Z-axis direction). Further, a direction T is a direction that makes an angle of inclination θ ($0°<θ<90°$) from the direction M towards the direction S.

Each of the light emitting units v1 to v12 is a vertical cavity surface emitting laser (VCSEL) having an emission wavelength of 780 nanometers.

Referring back to FIG. 2, the coupling lens 15 collimates the light beam emitted from the light source 14.

The aperture plate 16 includes an aperture and defines a diameter of the light beam coming from the coupling lens 15.

The cylindrical lens 17 forms an image of the light beam, which passes through the aperture of the aperture plate 16, in the vicinity of a deflecting-reflecting surface of the polygon mirror 13, in a direction corresponding to the sub-scanning direction (in the example shown in FIG. 2, Z-axis direction).

An optical system disposed on an optical path between the light source 14 and the polygon mirror 13 is also referred to as a pre-deflector optical system. The pre-deflector optical system according to the present embodiment includes the coupling lens 15, the aperture plate 16, and the cylindrical lens 17.

The polygon mirror 13 includes mirrors on four surfaces and each mirror functions as the deflecting-reflecting surface. The polygon mirror 13 rotates at a constant speed around an axis parallel to the direction (in the example shown in FIG. 2, Z-axis direction) corresponding to the sub-scanning direction, and deflects the light beam coming from the cylindrical lens 17.

The deflector-side scanning lens 11a is disposed on the optical path of the light beam deflected by the polygon mirror 13.

The image-surface-side scanning lens 11b is disposed on the optical path of the light beam coming from the deflector-side scanning lens 11a. The light beam that has passed through the image-surface-side scanning lens 11b is irradiated on the surface of the photosensitive drum 1030 and an optical spot is formed. The optical spot moves in a longitudinal direction of the photosensitive drum 1030 with the rotation of the polygon mirror 13. In other words, the photosensitive drum 1030 is scanned. A movement direction of the optical spot corresponds to the main scanning direction.

The optical system disposed on the optical path between the polygon mirror 13 and the photosensitive drum 1030 is also referred to as a scanning optical system. The scanning optical system according to the present embodiment includes the deflector-side scanning lens 11a and the image-surface-side scanning lens 11b.

Referring back to FIG. 2, from the light beam deflected by the polygon mirror 13 and passing through the scanning optical system, some portion of the light beam prior to scanning and not related to image formation is incident on the light detecting sensor 18a via the light detecting mirror 19a. From the light beam deflected by the polygon mirror 13 and passing through the scanning optical system, some portion of the light beam after scanning and not related to the image formation is incident on the light detecting sensor 18b via the light detecting mirror 19b.

Each of the light detecting sensor 18a and 18b includes a plurality of light receiving elements or a plurality of light receiving regions corresponding to a plurality of the light emitting units. Each light receiving element or each light receiving region respectively generates photoelectric conversion signals and outputs the signals to the scanning controller 22.

As shown in FIG. 4, the scanning controller 22 includes a CPU 210, a flash memory 211, a RAM 212, an interface (I/F) 214, a pixel-clock generating circuit 215, an image processing circuit 216, a frame memory 217, line buffers $218_1$ to $218_{12}$, a writing control circuit 219, and a light-source drive circuit 221. Arrows shown in FIG. 4 indicate a flow of typical signals and data, and do not express all connection relations of each clock.

The pixel-clock generating circuit 215 generates pixel clock signals.

The frame memory 217 temporarily stores therein raster-expanded image data (hereinafter, "raster data").

The image processing circuit 216 reads the raster data stored in the frame memory 217 and generates, upon carrying out a predetermined halftone process, a dot data for each of the light emitting units v1 to v12, and outputs the dot data to the line buffers $218_1$ to $218_{12}$ corresponding to the light emitting units v1 to v12, respectively.

Based on output signals of the light detecting sensor 18a, the writing control circuit 219 calculates a scanning start timing. The writing control circuit 219 reads the dot data of each of the light emitting units v1 to v12 from the line buffers $218_1$ to $218_{12}$ in synchronization with the scanning start time and generates independent modulation data for each of the light emitting units v1 to v12 along with superimposing to the pixel clock signals from the pixel-clock generating circuit 215.

The light source drive circuit 221 drives each of the light emitting units v1 to v12 of the two-dimensional array 100 depending on the modulation data from the writing control circuit 219.

The flash memory 211 stores therein various computer programs described by program codes decodable by the CPU 210 and various data used for executing various computer programs.

The RAM 212 is a work memory.

The CPU 210 operates according to the computer programs stored in the flash memory 211 and controls the entire optical scanning device 1010.

The I/F 214 is a communication I/F that controls the two-way communication with the printer controller 1060. Image data from the higher-level device is received via the I/F 214.

Figure 5:
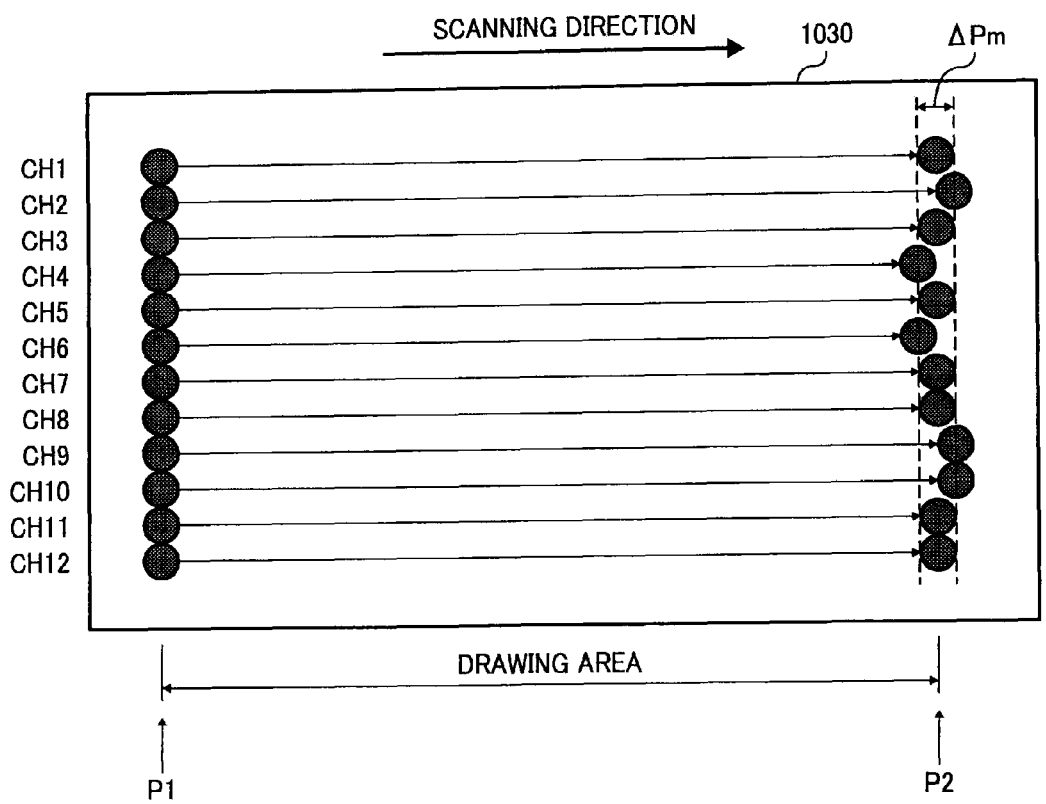
FIG. 5 is a schematic diagram for explaining a variation ΔPm of displacement of optical spots in a main scanning direction.

As shown in FIG. 5, a position of the optical spot on the surface of the photosensitive drum 1030 is displaced in the main scanning direction with respect to a desired position of the optical spot. A position P1 shown in FIG. 5 indicates a drawing start position of a drawing area (effective scan area) and a position P2 indicates a drawing end position of the drawing area. A symbol ΔPm shown in FIG. 5 indicates a magnitude of variation of the displacement amount (hereinafter, "main-scanning displacement amount") of the optical spots in the main scanning direction of all the light beams CH (CH1 to CH12).

Figure 6:
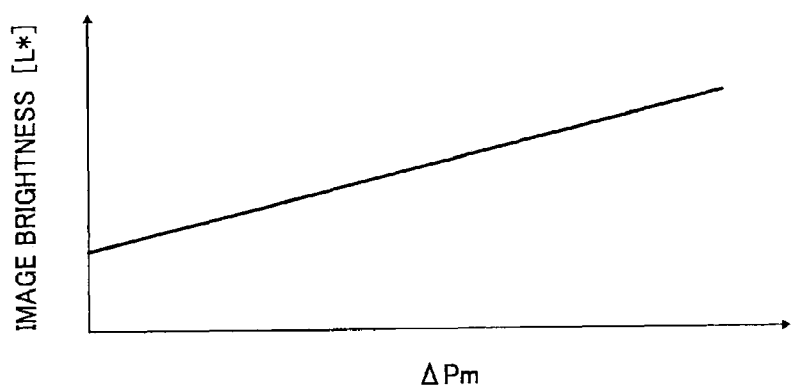
FIG. 6 is a graph of a relation between ΔPm and image brightness.

As shown in FIG. 6, if ΔPm increases, an image brightness (L*) increases when printed on the sheet.

Figure 7A:
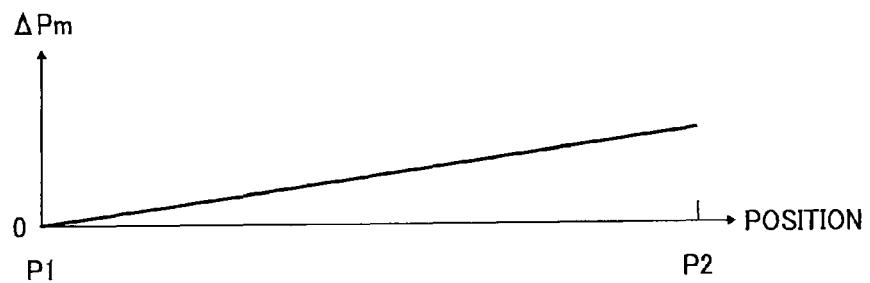
FIGS. 7A to 7C are schematic diagrams for explaining variation in image density due to ΔPm.
Figure 7B:
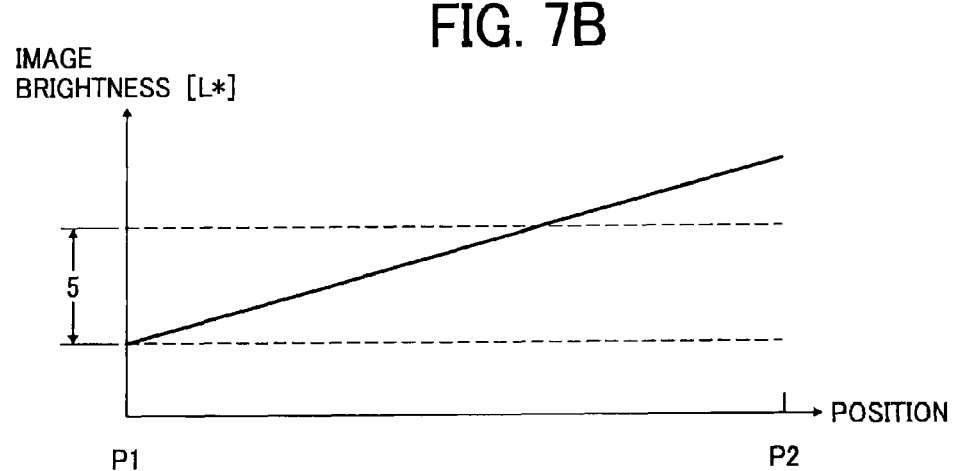
Figure 7C:

As shown in FIG. 7A, if ΔPm increases in a straight line from the drawing start position P1 towards the drawing end position P2 and when printed on the sheet, the image brightness (L*) increases in a straight line from the drawing start position P1 towards the drawing end position P2 as shown in FIG. 7B. For example, if the brightness difference is equal to or larger than 5 levels, the density difference between one end of the sheet and the other end of the sheet can be apparently seen as shown in FIG. 7C.

Figure 8:
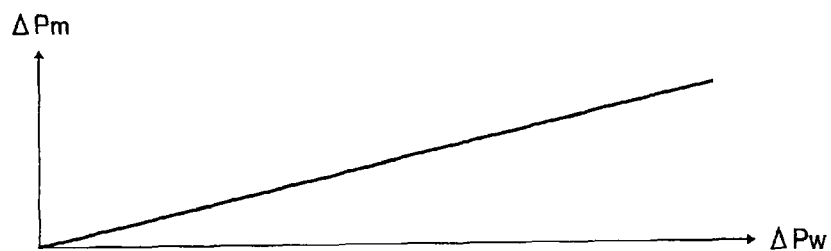
FIG. 8 is a graph of a relation between ΔPm and a light-emitting-power correction amount.

When carrying out an image data writing process on the photosensitive drum 1030, if the brightness difference may become equal to or larger than 5 levels, the CPU 210 carries out a brightness-difference correction process such that the brightness difference is not apparently seen. The brightness-difference correction process executed by the CPU 210 is explained below. It is assumed that a relation between "ΔPm" and "ΔPw" that is a light-emitting power correction amount required for controlling a change of the image brightness (L*) (see FIG. 8) is calculated in advance by experiments, simulations, theoretical calculations etc. and stored in the flash memory 211.

(1) Based on the output signals of the light detecting sensors 18*a* and 18*b*, the main-scanning displacement amount at the drawing end position P2 is calculated for each light emitting unit.

(2) ΔPm at the drawing end position P2 is calculated from the main-scanning displacement amount for each light emitting unit.

(3) When the brightness difference may become equal to or larger than 5 levels, the relation between ΔPm and ΔPw stored in the flash memory 211 is referred to, and the light-emitting power correction amount ΔPw corresponding to ΔPm obtained at (2) is calculated.

(4) Light emitting power Pw1 at the drawing start position P1 and light emitting power Pw2 (=Pw1+ΔPw) at the drawing end position P2 are determined.

Figure 9:
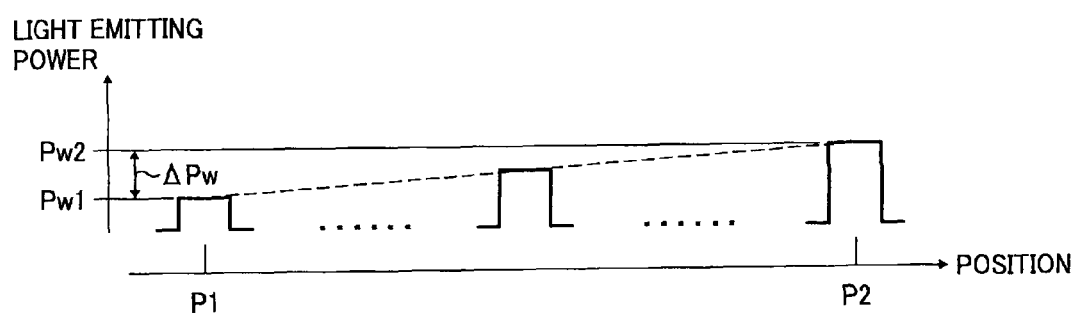
FIG. 9 is a schematic diagram for explaining correction of light emitting power.

(5) The light-source drive circuit 221 is instructed to change the light emitting power from Pw1 to Pw2 to be almost in a straight line from the drawing start position P1 towards the drawing end position P2 (see FIG. 9). In other words, the light emitting power is modulated and a writing energy density is corrected.

Concretely, as shown in FIG. 10A, the writing energy density on the surface of the photosensitive drum 1030 changes almost in a straight line from the drawing start position P1 towards the drawing end position P2. As a result, as shown in FIG. 10B, the image brightness (L*) becomes almost uniform when printed on the sheet, and as shown in FIG. 10C, little density difference is seen between one end of the sheet and the other end of the sheet.

As described above, in the optical scanning device 1010, a correcting device includes the scanning controller 22.

The processes performed by the computer programs executed by the CPU 210 can be realized at least partly or entirely by using hardware.

A write method according to the present embodiment is executed in the brightness-difference correction process mentioned above.

As described above, in the optical scanning device 1010, the scanning controller 22 calculates, based on the output signals of the light detecting sensors 18*a* and 18*b*, ΔPm at the drawing end position P2, and determines the light emitting power Pw1 at the drawing start position P1 and the light emitting power Pw2 (=Pw1+ΔPw) at the drawing end position P2. The scanning controller 22 instructs the light-source drive circuit 221 to change the light emitting power from Pw1 to Pw2 to be almost in a straight line from the drawing start position P1 towards the drawing end position P2. Concretely, the writing energy density on the surface of the photosensitive drum 1030 changes along a substantial straight line from the drawing start position P1 to the drawing end position P2. As a result, when printed on the sheet, the image brightness (L*) becomes almost uniform and little density difference is seen between one end of the sheet and the other end of the sheet. Thus, the desired latent image can be formed on the surface of the photosensitive drum 1030 without increasing costs.

Furthermore, the laser printer 1000 includes the optical scanning device 1010 that can form a desired latent image on the surface of the photosensitive drum 1030 without increasing costs. Thus, a high quality image can be formed at a low cost.

Figure 11:
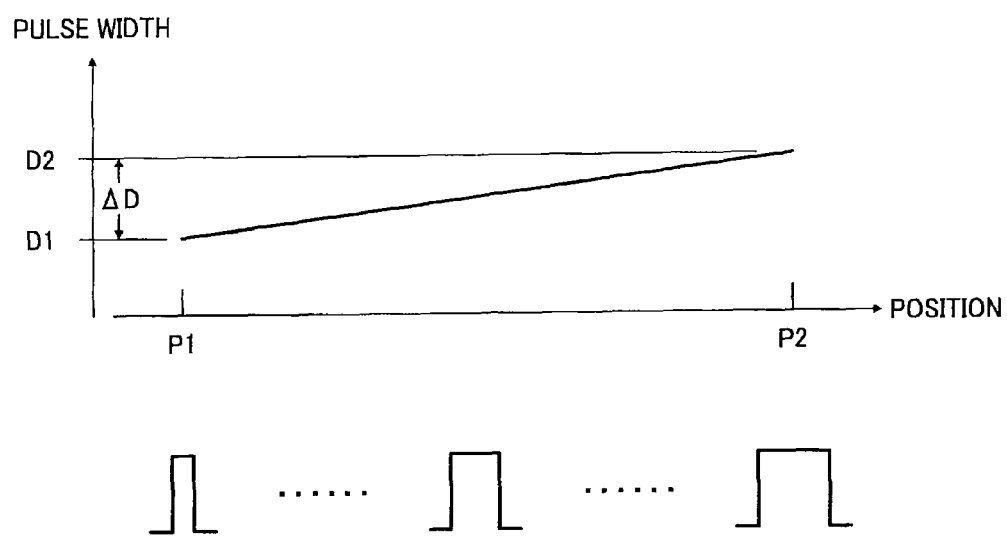
FIG. 11 is a schematic diagram for explaining a pulse width modulation.

Although the writing energy density is corrected by modulating the light emitting power as explained in the embodiment, the present invention is not to be thus limited. For example, as shown in FIG. 11, the writing energy density can be corrected by modulating a pulse width.

Although the writing energy density is corrected such that the writing energy density changes almost in a straight line from the drawing start position P1 towards the drawing end position P2 as explained above, the writing energy density can be corrected such that the writing energy density changes in a stepped manner.

Further, the writing energy density can also be partially changed.

Although the two-dimensional array 100 that includes 12 light emitting units is explained in the embodiment, the present invention is not to be thus limited.

Furthermore, a unidimensional array having a plurality of the light emitting units unidimensionally arranged can be used in place of the two-dimensional array 100.

The image forming apparatus is not limited to the laser printer 1000. As long as the image forming apparatus includes the optical scanning device 1010, high quality images can be formed without increasing costs.

For example, the image forming apparatus can be one that irradiates laser beams directly on a medium (for example, a sheet) capable of being colored with the laser beams.

Further, the image forming apparatus that uses a silver film as an image carrying member can be used. In this case, the latent image is formed on the silver film by optical scanning and the latent image can be visualized by a process equivalent to a developing process in normal silver halide photography. Further, the latent image can be transferred to a photographic printing paper by a process equivalent to a printing process in the normal silver halide photography. Such an image forming apparatus can be executed as an optical printing device and as an optical drawing device that takes computer tomography (CT) scan images etc.

Also in the image forming apparatus that forms multicolor images, high quality images can be formed at a high speed by using the optical scanning device that supports color images.

Figure 12:
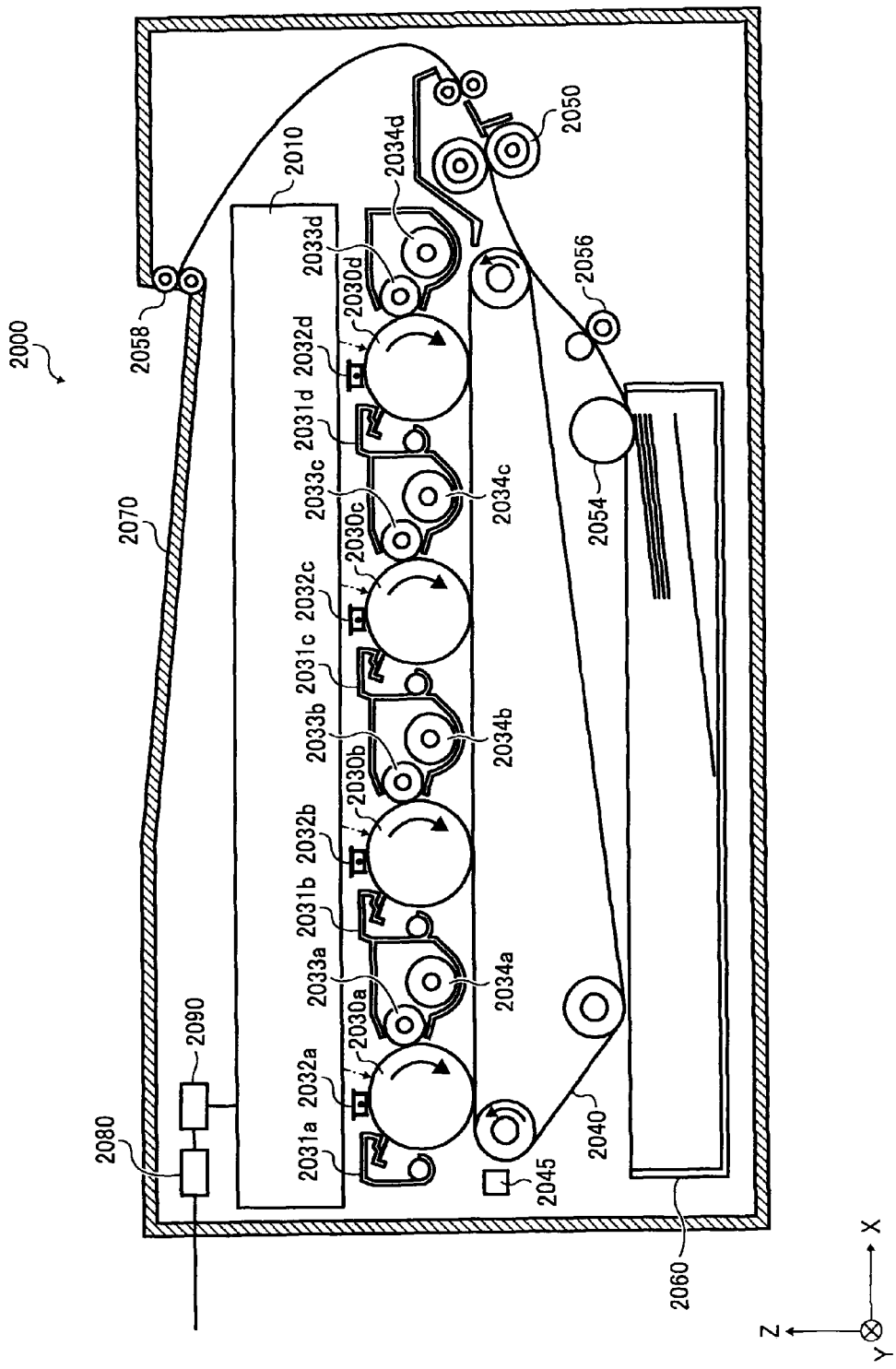
FIG. 12 is a schematic diagram of a tandem color machine.

For example, as shown in FIG. 12, a printer 2000 that supports color images and includes a plurality of the photosensitive drums can also be used.

The printer 2000 is a tandem-type multicolor printer that forms full color images by superimposing four colors (black, cyan, magenta, and yellow) one on top of the other. The printer 2000 includes an optical scanning device 2010, four photosensitive drums 2030*a*, 2030*b*, 2030*c*, and 2030*d*, four electrostatic chargers 2032*a*, 2032*b*, 2032*c*, and 2032*d*, four developing rollers 2033*a*, 2033*b*, 2033*c*, and 2033*d*, four toner cartridges 2034*a*, 2034*b*, 2034*c*, and 2034*d*, four cleaning cases 2031*a*, 2031*b*, 2031*c*, and 2031*d*, a transfer belt 2040, a sheet feeding tray 2060, a sheet feeding roller 2054, a pair of registration rollers 2056, a fixing roller 2050, a discharge tray 2070, discharge rollers 2058, a displacement detector 2045, a communication controller 2080, and a printer controller 2090 that integrally controls the above units.

Figure 13:
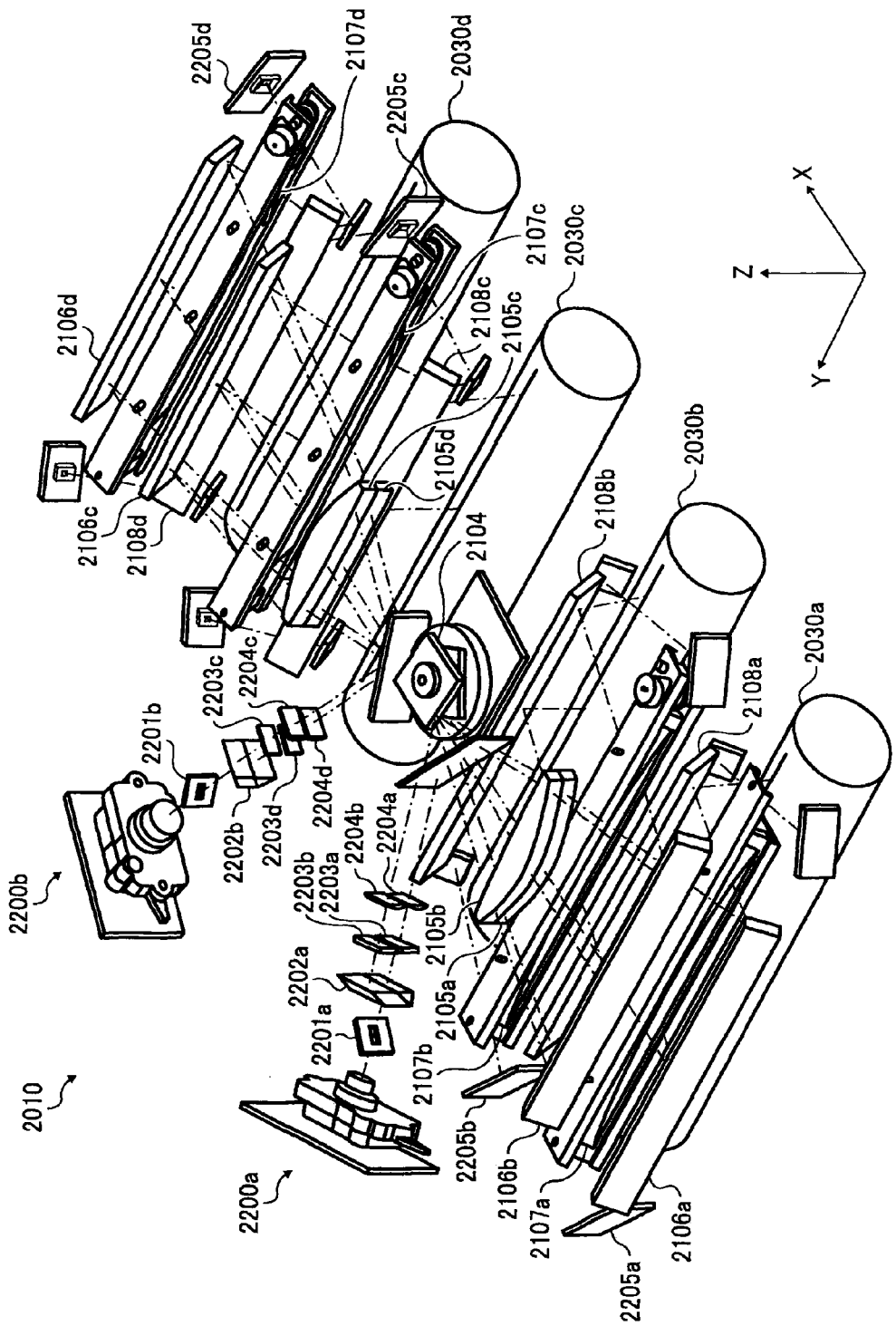
FIG. 13 is a perspective view of an optical scanning device shown in FIG. 12.
Figure 14:
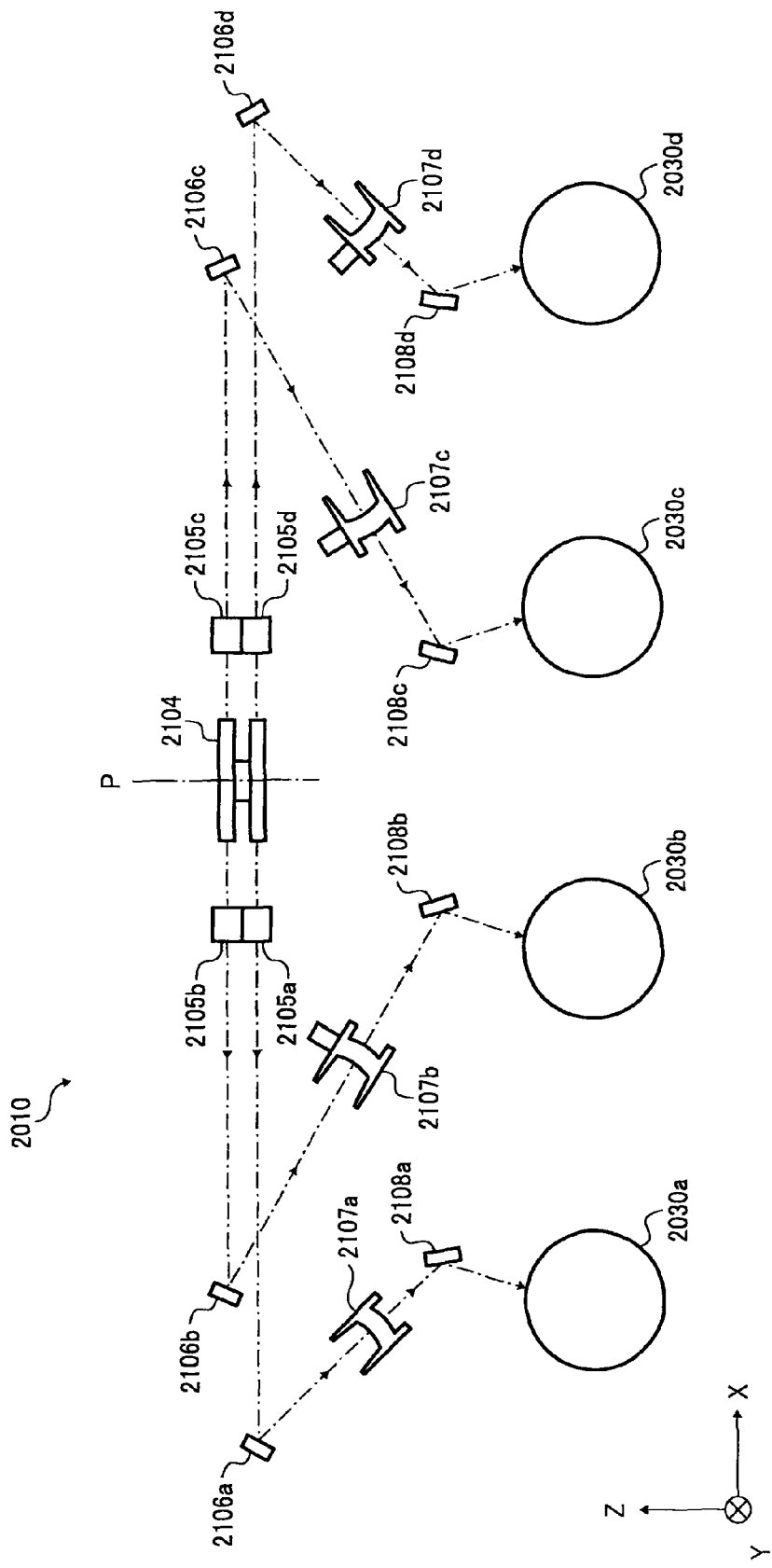
FIG. 14 is a side view of the optical scanning device shown in FIG. 12.

As shown in FIGS. 13 and 14, the optical scanning device 2010 includes two light source units 2200*a* and 2200*b*, two aperture plates 2201*a* and 2201*b*, two light-beam splitting prisms 2202*a* and 2202*b*, a polygon mirror 2104, four liquid-crystal deflecting elements 2203*a*, 2203*b*, 2203*c*, and 2203*d*, four cylindrical lenses 2204*a*, 2204*b*, 2204*c*, and 2204*d*, four fθ lenses 2105a, 2105b, 2105c, and 2105d, eight reflecting mirrors 2106a, 2106b, 2106c, 2106d, 2108a, 2108b, 2108c, and 2108d, four toroidal lenses 2107a, 2107b, 2107c, and 2107d, four synchronization detecting sensors 2205a, 2205b, 2205c, and 2205d, and a scanning controller (not shown).

The photosensitive drum 2030a, the electrostatic charger 2032a, the developing roller 2033a, the toner cartridge 2034a, the cleaning case 2031a, the liquid-crystal deflecting element 2203a, the cylindrical lens 2204a, the fθ lens 2105a, the reflecting mirror 2106a, the toroidal lens 2107a, the reflecting mirror 2108a, and the synchronization detecting sensor 2205a are used in combination, and constitute an image forming station (hereinafter, "K station") that forms a black image.

The photosensitive drum 2030b, the electrostatic charger 2032b, the developing roller 2033b, the toner cartridge 2034b, the cleaning case 2031b, the liquid-crystal deflecting element 2203b, the cylindrical lens 2204b, the fθ lens 2105b, the reflecting mirror 2106b, the toroidal lens 2107b, the reflecting mirror 2108b, and the synchronization detecting sensor 2205b are used in combination, and constitute an image forming station (hereinafter, "C station") that forms a cyan image.

The photosensitive drum 2030c, the electrostatic charger 2032c, the developing roller 2033c, the toner cartridge 2034c, the cleaning case 2031c, the liquid-crystal deflecting element 2203c, the cylindrical lens 2204c, the fθ lens 2105c, the reflecting mirror 2106c, the toroidal lens 2107c, the reflecting mirror 2108c, and the synchronization detecting sensor 2205c are used in combination, and constitute an image forming station (hereinafter, "M station") that forms a magenta image.

The photosensitive drum 2030d, the electrostatic charger 2032d, the developing roller 2033d, the toner cartridge 2034d, the cleaning case 2031d, the liquid-crystal deflecting element 2203d, the cylindrical lens 2204d, the fθ lens 2105d, the reflecting mirror 2106d, the toroidal lens 2107d, the reflecting mirror 2108d, and the synchronization detecting sensor 2205d are used in combination, and constitute an image forming station (hereinafter, "Y station") that forms a yellow image.

Each of the light source units 2200a and 2200b includes the two-dimensional array 100.

The light beam, which is emitted from the light source unit 2200a and passing through the aperture of the aperture plate 2201a, is split into a light beam for the K station and a light beam for the C station by the light-beam splitting prism 2202a. Further, the light beam, which is emitted from the light source unit 2200b and passing through the aperture of the aperture plate 2201b, is split into a light beam for the M station and a light beam for the Y station by the light-beam splitting prism 2202b.

The light beam for the K station passes through the liquid-crystal deflecting element 2203a and the cylindrical lens 2204a, and is deflected by the polygon mirror 2104. Subsequently, the light beam passes through the fθ lens 2105a, the reflecting mirror 2106a, the toroidal lens 2107a, and the reflecting mirror 2108a, and is focused on a surface of the photosensitive drum 2030a.

The light beam for the C station passes through the liquid-crystal deflecting element 2203b and the cylindrical lens 2204b, and is deflected by the polygon mirror 2104. Subsequently, the light beam passes through the fθ lens 2105b, the reflecting mirror 2106b, the toroidal lens 2107b, and the reflecting mirror 2108b, and is focused on a surface of the photosensitive drum 2030b.

The light beam for the M station passes through the liquid-crystal deflecting element 2203c and the cylindrical lens 2204c, and is deflected by the polygon mirror 2104. Subsequently, the light beam passes through the fθ lens 2105c, the reflecting mirror 2106c, the toroidal lens 2107c, and the reflecting mirror 2108c, and is focused on a surface of the photosensitive drum 2030c.

The light beam for the Y station passes through the liquid-crystal deflecting element 2203d and the cylindrical lens 2204d, and is deflected by the polygon mirror 2104. Subsequently, the light beam passes through the fθ lens 2105d, the reflecting mirror 2106d, the toroidal lens 2107d, and the reflecting mirror 2108d, and is focused on a surface of the photosensitive drum 2030d.

Each of the synchronization detecting sensors 2205a to 2205d is similar to the light detecting sensor 18a and used for detecting start of main scanning in the corresponding photosensitive drum.

Figure 15:
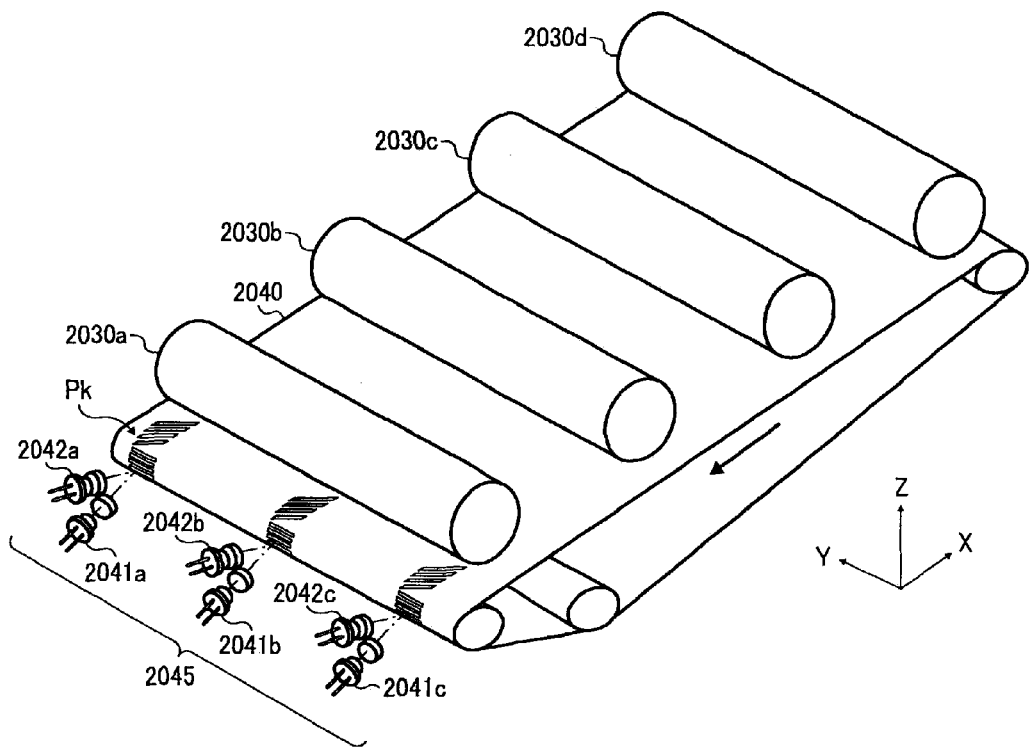
FIG. 15 is a schematic diagram of a displacement detector shown in FIG. 12.

As shown in FIG. 15, the displacement detector 2045 is disposed on −X side of the transfer belt 2040. The displacement detector 2045 includes an LED 2042a, a photosensor 2041a, an LED 2042b, a photosensor 2041b, an LED 2042c, and a photosensor 2041c. The LED 2042a illuminates a +Y side end (assumed as a detection position 0) of the transfer belt 2040. The photosensor 2041a receives a reflected light from the LED 2042a. The LED 2042b illuminates a central portion (assumed as a detection position 1) of the transfer belt 2040. The photosensor 2041b receives the reflected light from the LED 2042b The LED 2042c illuminates a −Y side end (assumed as a detection position 2) of the transfer belt 2040. The photosensor 2041c receives the reflected light from the LED 2042c.

As shown in FIG. 15, the displacement detector 2045 illuminates detection patterns (toner patches) Pk, which are formed at each detection position, using the respective LEDs, receives the reflected light using each photosensor, and thus outputs a plurality of signals that include displacement data in the main scanning direction.

Figure 16:
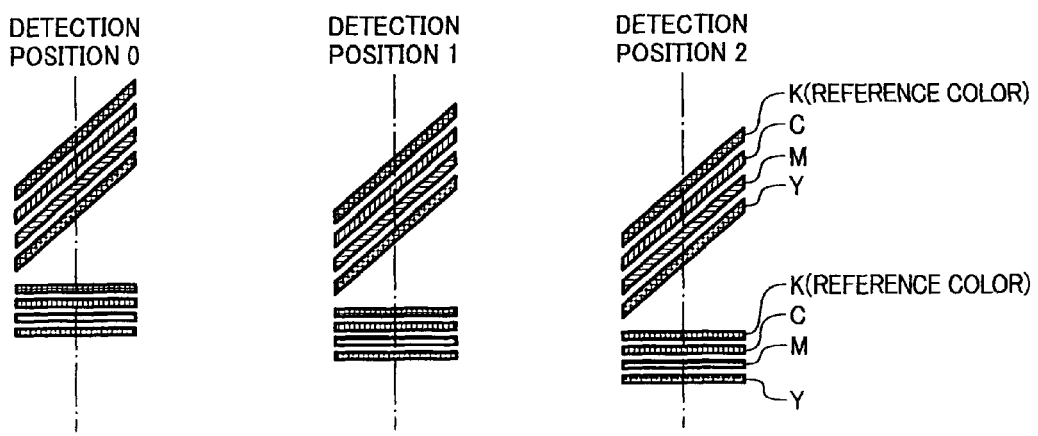
FIG. 16 is a schematic diagram for explaining toner patches for displacement detection.

As shown in FIG. 16, each detection pattern Pk is formed of a first set of lines that is arranged such that a longitudinal direction is parallel to the main scanning direction and a second set of lines that is arranged such that a longitudinal direction is inclined at 45° with respect to the main scanning direction.

The scanning controller calculates, from the output signals of the displacement detector 2045, the main-scanning displacement amount for each scanning line on the photosensitive drum (for example, see Japanese Patent No. 3644923). For example, when the brightness difference may be equal to or larger than 5 levels, the scanning controller corrects, similar to the scanning controller 22, the writing energy density by modulating the light emitting power for each photosensitive drum.

In the printer 2000, the scanning controller can be set for each color or for each pair of two colors.

According to an aspect of the present invention, a correcting device corrects a writing energy density, which is an amount of light per unit surface area of a target surface to be scanned, with respect to a write position based on a displacement amount in a main scanning direction of each of a plurality of light beams focused on the target surface such that a density change of an image due to a variation of the displacement amount is reduced. Consequently, a desired image can be formed on the target surface without increasing costs.

According to another aspect of the present invention, when the displacement amount in the main scanning direction is calculated for each of the light beams that are focused on the target surface and if the displacement amount exceeds a threshold, the writing energy density is corrected with respect to the write position such that the density change of the image due to the variation of the displacement amount is reduced. Consequently, the desired image can be formed on the exposed scan surface without increasing costs.

According to still another aspect of the present invention, because at least one optical scanning device according to the present invention can be provided in an image forming apparatus, a high quality image can be formed without increasing costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   at least one image carrying member; and
   at least one optical scanning device that scans the image carrying member with a plurality of light beams to write image data on the image carrying member, the optical scanning device including
   a light source that includes a plurality of light emitting units each emitting a light beam;
   an optical system that focuses the light beams on the image carrying member as optical spots and scans the image carrying member in a main scanning direction with the light spots; and
   a correcting unit that corrects, based on a displacement amount of each of the light beams in the main scanning direction, writing energy density at a write position such that a variation in image density due to a variation of the displacement amount is reduced; and
   wherein the correcting unit corrects the writing energy density such that the writing energy density changes in the main scanning direction; and
   wherein the correcting unit corrects the writing energy density such that the writing energy density changes from a drawing start position toward a drawing end position of an effective scan area in the main scanning direction.

2. The image forming apparatus according to claim 1, wherein the image data is multicolor image data.

3. A write method of writing image data on a target surface by scanning the target surface with a plurality of light beams, the writing method comprising:
   acquiring a displacement amount of each of the light beams in the main scanning direction; and
   correcting, when a difference between any two of the displacement amounts of the light beams is larger than a threshold, based on the displacement amount, writing energy density at a write position such that a variation in image density due to a variation of the displacement amount is reduced.

4. An optical scanning device that scans a target surface with a plurality of light beams to write image data on the target surface, the optical scanning device comprising:
   a light source that includes a plurality of light emitting units each emitting a light beam;
   an optical system that focuses the light beams on the target surface as optical spots and scans the target surface in a main scanning direction with the optical spots; and
   a correcting unit that corrects, based on a displacement amount of each of the light beams in the main scanning direction, writing energy density at a write position such that a variation in image density due to a variation of the displacement amount is reduced; and
   wherein the correcting unit corrects the writing energy density such that the writing energy density changes in the main scanning direction; and
   wherein the correcting unit corrects the writing energy density such that the writing energy density changes from a drawing start position toward a drawing end position of an effective scan area in the main scanning direction.

5. The optical scanning device according to claim 4, wherein correction data of the writing energy density is the same for at least two scan lines that are adjacent to each other among the scan lines.

6. The optical scanning device according to claim 4, wherein the correcting unit corrects the writing energy density by either one of power modulation and pulse width modulation.

7. The optical scanning device according to claim 4, further comprising a displacement detecting unit that detects the displacement amount and provides the displacement amount to the correcting unit.

8. The optical scanning device according to claim 4, wherein the light source is a surface-emitting laser array.

9. The optical scanning device according to claim 4, wherein the writing energy density is an amount of light per unit surface area of the target surface.

10. The optical scanning device of claim 4, further comprising a memory that stores a light-emitting power correction amount for controlling a change of the image density in association with a magnitude of the displacement amount of the optical spots in the main scanning direction of all the light beams, and wherein the correcting unit corrects the writing energy density based on the light-emitting power correction amount stored in the memory.

11. The optical scanning device of claim 10, wherein the correcting unit (i) calculates a magnitude of the displacement amount of the optical spots in the main scanning direction of all the light beams, (ii) obtains a light-emitting power correction amount corresponding to the calculated magnitude from the memory, (iii) determines light emitting power at the drawing end position as a sum of light-emitting power at the drawing start position and obtained light-emitting power correction amount, and (iv) changes the light-emitting power substantially linearly from the drawing start position to the drawing end position to correct the writing energy density.

* * * * *